Feb. 10, 1948.  A. G. C. NEHLS  2,435,943
OIL SEAL
Filed March 25, 1946

INVENTOR.
Arthur G. C. Nehls
BY
Cromwell, Greist & Warden
ATTORNEYS

Patented Feb. 10, 1948

2,435,943

UNITED STATES PATENT OFFICE 2,435,943

OIL SEAL

Arthur G. C. Nehls, Detroit, Mich., assignor to Chicago Rawhide Manufacturing Company, Chicago, Ill., a corporation of Illinois Application March 25, 1946, Serial No. 657,009

12 Claims. (Cl. 288—3)

The present invention relates to improvements in a sealing device for coaction with a pair of relatively rotatable parts to prevent leakage of a lubricant or other fluid, as well as to prevent entrance of dirt or other foreign matter, past the coacting surfaces of the seal and the aforementioned parts.

It is an object of the invention to provide a seal of the type described which is of a very simple and inexpensive self-contained construction, requiring a minimum of operations in the fabrication and assembly of the parts thereof.

More specifically, it is an object of the invention to provide an annular flexible sealing member associated with a simple, inexpensive sheet metal housing which surrounds and grips said member in its operative position, and an annular spring coacting with an extension on the member to continually urge the same towards an effective sealing position.

Other objects of the invention will be apparent to those skilled in the art upon a consideration of the following specification and by reference to the accompanying drawings, in which.

This invention relates to an improved oil seal adapted for coaction with a pair of relatively rotatable parts to prevent leakage of lubricating oil or loss of other liquid therebetween, as well as the entrance of dirt, impurities, or other foreign matter. A feature of the seal is the simplicity and inexpensiveness of its construction. In a preferred embodiment it incorporates merely a simple, one-piece sheet metal housing adapted to be fixedly associated with one of the aforesaid parts, a packing or sealing member fixedly clamped in an internal portion of the housing, and a constrictive garter spring cammingly or wedgingly engaged between another portion of the housing and an extension of the sealing member, to insure effective sealing action of said member against the other of the aforementioned relatively rotatable parts. The component elements of the seal are very readily and quickly assembled and the seal is equally readily applied to the parts with which it coacts in its sealing function. In operative position it provides a unitary packing having a sealing action fully equivalent in efficiency or surpassing that of much more complicated and expensive constructions.

Figure 1:
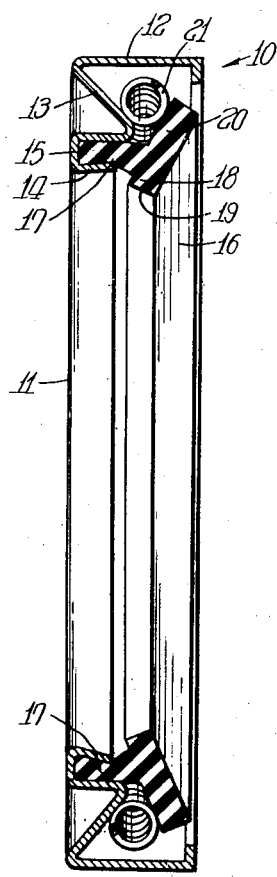
Fig. 1 is a somewhat enlarged view in longitudinal vertical section through a seal in accordance with one embodiment of the invention, illustrating the simplified character of the parts and assembly, the seal being shown in its relaxed condition prior to installation.

Referring to the drawings, in Fig. 1, wherein the seal 10 of the invention is illustrated in its relaxed or inoperative position prior to assembly of the pair of relatively rotatable parts to be sealed, the reference numeral 11 generally designates the external annular casing or housing of the seal. This is fabricated of sheet metal of an appropriate gauge conformed to provide an outer peripheral, axially extending portion 12, a radially and inwardly inclined web or wall 13 of re-entrant character integral with and extending from the edge of said portion 12, and an outward return portion 14 which is terminally formed into an inwardly facing channel 15. This channel opens axially of the housing and is adapted to receive and grip a flexible sealing or packing member, designated by reference numeral 16, said channel being of adequate radial width to permit ready initial insertion of the member 16 in the manner to be described.

The sealing or packing member 16 is preferably fabricated of flexible sealing or packing material, such as leather, rubber, synthetic rubber, or other material or composition capable of an efficient sealing action and of sustaining the conditions arising during its use in a seal of the type under construction. Member 16 is conformed in molding or fabrication to provide a generally axially extending, annular rear sleeve or flange portion 17, a radially inwardly projecting annular nose piece or sealing portion 18 of relatively small size, having an inner circumferential sealing surface 19, and a rearwardly projecting pressure portion 20 in alignment with said sealing portion. This angularly conformed member is associated with the housing member 11 by inserting the axial portion 17 thereof in the channel 15 and crimping, spinning or otherwise deforming the inner channel wall radially outwardly so as to fixedly clamp the packing member 16 relative to the housing. Preferably prior to assembly of the member 16 in the housing in the manner described, an annular coiled garter spring of well known type is assembled with the housing and member, being disposed between the outwardly angled pressure portion 20 of the member and the radially inwardly inclined wall 13 of the housing, in the manner clearly illustrated in Fig. 1.

In assembled condition the sealing portion 18 of the member 16 is substantially tilted in the radial inward direction, both as a result of the clamping action on the sealing member flange 17 in channel 15 and by reason of the constrictive action of spring 21. It will be noted that spring 21 has a camming engagement with the inclined housing wall 13 causing said spring to act radially and axially against the extension or pressure portion 20 of the packing member to effect the aforesaid inward tilting. The method of clamping flange 17 in the channel is also inherently such as to tend to dispose the sealing in the radially tilted position, even without the spring.

Figure 2:
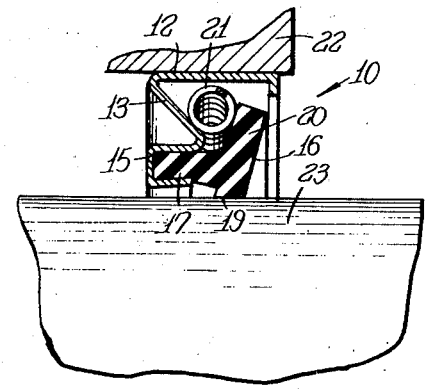
Fig. 2 is a fragmentary view in section similar to Fig. 1, illustrating the seal of that figure in operative assembled relation to a pair of relatively rotating parts, such as a shaft and housing therefor.

In the operative position of the seal, as illustratively shown in Fig. 2, the housing 11 is fixedly associated, as by press fitting, with one of a pair of relatively rotatable parts, for example, in the fixed housing 22. The shaft 23 is disposed axially through the seal, causing the sealing portion 18 thereof to be forced radially outwardly and thereby effecting a snug sealing engagement of the sealing surface 19 with the shaft. Garter spring 21 is caused to ride up along re-entrant wall 13 somewhat by the compression thereof between the convergent surfaces of pressure portion 20 of the sealing member and the inclined wall 13, and thereafter exerts radially constrictive action on the member 16. It may freely shift axially along said wall if the sealing portion 18 is moved radially under the effect of shaft misalignment or the like, but continues to act uniformly on the pressure portion 20. Immediate effective operation of the seal is assured to prevent passage of liquid or foreign matter past the sealing surface 19 and the relatively rotatable shaft surface.

Figure 3:
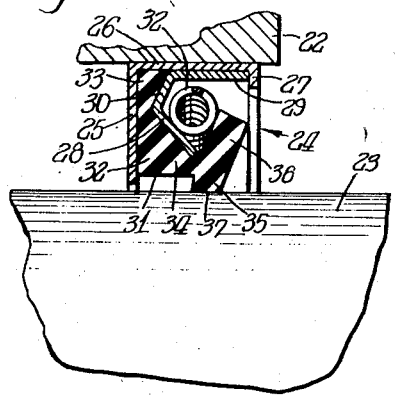
Fig. 3 is a view similar to Fig. 2, illustrating a modified embodiment of the seal in accordance with this invention.

In Fig. 3 I illustrate a slightly modified embodiment of the invention, differing only from that in Figs. 1 and 2 in details of construction of the seal housing. In this figure, the housing is designated largely by reference numeral 24, being fabricated of an outer annular sheet metal housing member of box-like, L-shaped cross section, including a radial wall 25, an outer axial peripheral portion 26 and an inwardly spun or crimped annular radial lip 27 opposite wall 25.

An inner annular clamping member 28 of angular conformation is concentrically associated with the housing 24, having an axially extending sleeve portion 29 which engages and parallels the peripheral housing wall portion 26 and internally abuts the lip 27 at one end. An angled clamping nose 30 is integrally formed on the opposite end of portion 28, terminating in a radially and inwardly inclined wall portion 31 on which the coil spring 32 is cammingly engaged.

The sealing member, designated generally by the reference numeral 32, has an external flange 33 which is effectively clamped between the radial wall 24 of the seal housing and clamping nose 30. It includes a further inner portion 34 of substantial thickness which abuts said wall, in the manner of a strut or spacer, in radially spaced relation to the shaft 23. Said portion 34 has integrally formed thereon the annular sealing portion or nose piece 35 and the rearwardly extending pressure portion 36, both similar to the corresponding portions 18, 19 of the embodiment shown in Figs. 1 and 2.

In its operation following assembly with a pair of relatively rotatable parts, the modified form shown in Fig. 3 is identical with that of Figs. 1 and 2. The sealing portion 35, originally in a tilted position as described above, is forced radially outwardly against the constrictive force of spring 32 and thereafter produces an efficient seal between its surface 37 and the surface of shaft 23.

It will be apparent to those skilled in the art that the principles of the invention, as embodied in the two forms selected for illustration, are equally well adapted to be incorporated in other embodiments, or employed with a pair of relatively rotatable parts other than the shaft and housing herein shown, or set up, with slight changes, in other relations to a pair of relatively rotatable parts than that shown. I desire therefore that the invention be considered in its broadest possible sense, within the scope of the appended claims.

I claim:

1. In a seal, a sealing member having an annular, flexible, generally radially directed sealing portion, a rigid annular member associated with said sealing member and presenting a spring-engaging surface, said sealing member having a pressure portion projecting in a radial direction away from said sealing portion, said pressure portion being disposed in force-transmitting relation to said sealing portion and in inclined convergent relation to said spring-engaging surface in the general direction of said sealing portion, and an annular, radially acting spring engaged with said surface and pressure portion to transmit force through the latter to said sealing portion.

2. In a seal, a sealing member having an annular, flexible, generally radially directed sealing portion, a rigid annular member associated with said sealing member and presenting a radially and axially inclined spring-engaging surface, said sealing member having a pressure portion projecting in a radial direction away from said sealing portion, said pressure portion being disposed in force-transmitting relation to said sealing portion and in inclined convergent relation to said spring-engaging surface in the general direction of said sealing portion, and an annular, radially acting spring engaged with said surface and pressure portion to transmit force through the latter to said sealing portion.

3. In a seal, a sealing member having an annular, flexible, generally radially directed sealing portion, a rigid annular member associated with said sealing member and presenting a radially and axially inclined spring-engaging surface, said sealing member having a radially and axially inclined pressure portion projecting in a direction away from said sealing portion, said pressure portion being disposed in force-transmitting relation to said sealing portion and in inclined convergent relation to said spring-engaging surface in the general direction of said sealing portion, and an annular, radially acting spring engaged with said surface and pressure portion to transmit force through the latter to said sealing portion.

4. A self-contained sealing unit for application to a housing about a centrally located shaft, comprising a rigid outer member having a generally conical portion within the same, a flexible inner member secured to the outer member and having a shaft-engaging portion and a generally conical portion extending outwardly of and away from the shaft-engaging portion, said last named portion being disposed in opposition to the generally conical portion of the outer member, and an endless coil spring positioned under tension about the flexible inner member between and in lateral wedging engagement with said two generally conical portions.

5. In a seal adapted for coaction with a pair of relatively rotatable parts, a housing adapted to be fixedly engaged with one of said parts, a radially and axially inclined wall in said housing, an annular packing member of flexible sealing material secured to said housing, said member including an annular sealing surface and a pressure portion extending at an angle to said wall to diverge therefrom in a radial direction away from said sealing surface, and spring means in said housing in camming engagement with and between said inclined wall and pressure portion, whereby force is exerted on said sealing surface tending to tilt the same from its normal relaxed position.

6. A self-contained seal adapted to be associated with a pair of relatively rotatable parts, comprising an external sheet metal housing shaped to provide an integral, radially and axially inclined wall portion, an annular sleeve-like sealing member of flexible packing material clamped at an edge thereof between said wall portion and an adjacent portion of the housing, said sealing member having an inner peripheral sealing element and an outer peripheral extension in the radial direction opposite said sealing element, and an annular, coiled compression spring disposed in constrictive wedging engagement between said wall portion and extension whereby said sealing element is urged radially inwardly to a substantially tilted position in the relaxed condition of the sealing member.

7. A self-contained seal adapted to be associated with a pair of relatively rotatable parts, comprising a metal housing, a clamping member fixedly disposed in said housing and coacting therewith in defining an annular channel, said member providing a radially and axially inclined wall, an annular sealing member of flexible packing material clamped in said channel, said sealing member having a peripheral sealing element and an annular pressure portion extending in a direction opposite said sealing element, and an annular spring disposed internally of the seal in constrictive wedging engagement between said wall and pressure portion.

8. A self-contained seal adapted to be associated with a pair of relatively rotatable parts, comprising a metal housing, a clamping member fixedly disposed in said housing and coacting therewith in defining an annular, radially opening channel, said member providing a radially and axially inclined wall, an annular sealing member of flexible packing material clamped in said channel, said sealing member having a peripheral, radially projecting sealing element and an annular pressure portion extending radially in a direction opposite said sealing element, and an annular coiled spring disposed internally of the seal in constrictive wedging engagement between said wall and pressure portion.

9. In a seal adapted for coaction of a pair of relatively rotatable parts, means defining a housing and providing a peripheral surface adapted to be fixedly engaged with one of said parts, a radially and axially inclined wall within the housing and an annular, axially opening channel, an annular packing member of flexible sealing material, comprising an annular flange fixedly clamped in said channel, a sealing element projecting from said flange in a radial direction toward the other of said relatively rotatable parts, a pressure portion extending radially outwardly of the flange in the opposite direction from said element to converge with said wall in the general direction of said sealing element, and an annular coiled spring in said housing in engagement with and between said inclined wall and pressure portion, whereby the latter and said element are tilted from a relaxed position thereof.

10. In a seal adapted for coaction with a pair of relatively rotatable parts, an integral, one-piece housing shaped to provide a peripheral portion adapted to be fixedly engaged with one of said parts and a radially and axially inclined wall connected to said portion, an annular packing member of flexible sealing material, said member being secured on one edge thereof in said housing and comprising a sealing portion, and a pressure portion extending in general alignment with said sealing portion and at an angle to said wall, and annular spring means in said housing in engagement with and between said inclined wall and pressure portion, whereby the sealing portion is tilted and urged radially inwardly for relatively rotatable sealing engagement with the other of said parts.

11. In a seal of the type described, an annular flexible sealing element including a marginal clamping edge at which said element is adapted to be fixedly mounted on a support, a sealing lip extending radially from the element adjacent the margin thereof opposite said clamping edge, and a pressure portion extending therefrom in the opposite radial direction adjacent said last named margin, said pressure portion being in radial force transmitting relation to said sealing lip, means providing a relatively rigid, generally conical pressure surface in fixed relation to said clamping edge and in inclined, convergent relation to said pressure portion, and an annular spring disposed concentrically of and in force transmitting relation to said pressure surface and pressure portion adjacent the apex of their angle of convergence, said spring having axially shiftable camming engagement with said conical surface to exert radial swinging effort on said pressure portion.

12. In a seal of the type described, an annular flexible sealing element of generally sleeve-like shape including a marginal clamping edge at which said element is adapted to be fixedly mounted on a support, a sealing lip extending radially inwardly from the element adjacent the margin thereof opposite said clamping edge, and a pressure portion extending radially outwardly therefrom adjacent said last named margin, said pressure portion being in radial force transmitting relation to said sealing lip, means providing a relatively rigid, generally conical pressure surface in fixed relation to said clamping edge and in inclined, inwardly convergent relation to said pressure portion, and an annular spring disposed concentrically of and in force transmitting relation to said pressure surface and pressure portion adjacent the apex of their angle of convergence, said spring having axially shiftable, radially constrictive camming engagement with said conical surface to exert radial swinging effort on said pressure portion.

ARTHUR G. C. NEHLS.

REFERENCES CITED

The following references are of record in the file of this patent:

UNITED STATES PATENTS

| Number | Name | Date |
|---|---|---|
| 1,690,839 | Roth | Nov. 6, 1928 |
| 1,905,800 | Chandler | Apr. 25, 1933 |
| 1,950,724 | Fitzgerald | Mar. 13, 1934 |
| 2,089,461 | Winter | Aug. 10, 1937 |
| 2,123,079 | Owen | July 5, 1938 |
| 2,195,708 | Owen | Apr. 2, 1940 |
| 2,264,062 | Wilder | Nov. 25, 1941 |
| 2,291,570 | Clark | July 28, 1942 |
| 2,319,067 | Kosatka | May 11, 1943 |